United States Patent [19]

Sanderson

[11] Patent Number: 5,042,237

[45] Date of Patent: Aug. 27, 1991

[54] BASKET CLEANER FOR A COTTON HARVESTER

[75] Inventor: Leon F. Sanderson, Des Moines, Iowa

[73] Assignee: Deere & Company, Moline, Ill.

[21] Appl. No.: 595,321

[22] Filed: Oct. 10, 1990

[51] Int. Cl.⁵ .................. A01D 46/08; A01D 46/10; A01D 90/12

[52] U.S. Cl. ..................... 56/10.2; 56/13.3; 56/16.6; 56/DIG. 7; 56/DIG. 15; 406/161

[58] Field of Search ............ 56/10.2, 13.3, 16.6, 56/16.5, 12.8, 28, 30, DIG. 7, DIG. 15; 406/2, 12, 159–161; 298/11, 18

[56] References Cited

U.S. PATENT DOCUMENTS

| | | | |
|---|---|---|---|
| 2,660,016 | 11/1953 | Richey | 56/13.3 X |
| 2,741,888 | 4/1956 | Hamel et al. | 56/30 X |
| 2,862,342 | 12/1958 | Fergason | 56/16.6 |
| 3,214,222 | 10/1965 | Nickla | 406/171 |
| 3,401,508 | 9/1968 | Keller | 56/12.2 |
| 3,412,532 | 11/1968 | Nickla | 56/13.3 |
| 3,412,533 | 11/1968 | Robinson, Jr. | 56/13.3 |
| 3,419,168 | 12/1968 | Isbell et al. | 56/13.3 X |
| 3,423,132 | 1/1969 | Blanton et al. | 406/161 |
| 4,221,508 | 9/1980 | Haines | 56/13.3 X |
| 4,606,177 | 8/1986 | Schlueter | 56/28 X |
| 4,662,160 | 5/1987 | Hubbard et al. | 56/16.6 |
| 4,928,459 | 5/1990 | Thedford et al. | 56/13.3 |
| 4,930,297 | 6/1990 | Schlueter et al. | 56/16.6 |

*Primary Examiner*—Stephen J. Novosad

[57] ABSTRACT

A cotton harvester includes air diverting structure for selectively directing air from the air duct structure over the top of the cotton harvester basket to blow away accumulated trash. The upper portion of the air duct is moveable from a normal operating position wherein cotton is directed into the basket, to a cleaning position wherein high velocity air from the duct is directed over the surface of the basket by an air deflector located at the upper forward end of the basket. When no cotton is being picked, such as during turns at the end of the field, the duct is moved from the operating position to the cleaning position to clear the trash from the basket surfaces. In another embodiment of the invention, a barrier in the form of either a brush or a pivoting element located on the dump side of the basket catches debris that would otherwise fall into the cotton receiving receptacle.

20 Claims, 4 Drawing Sheets

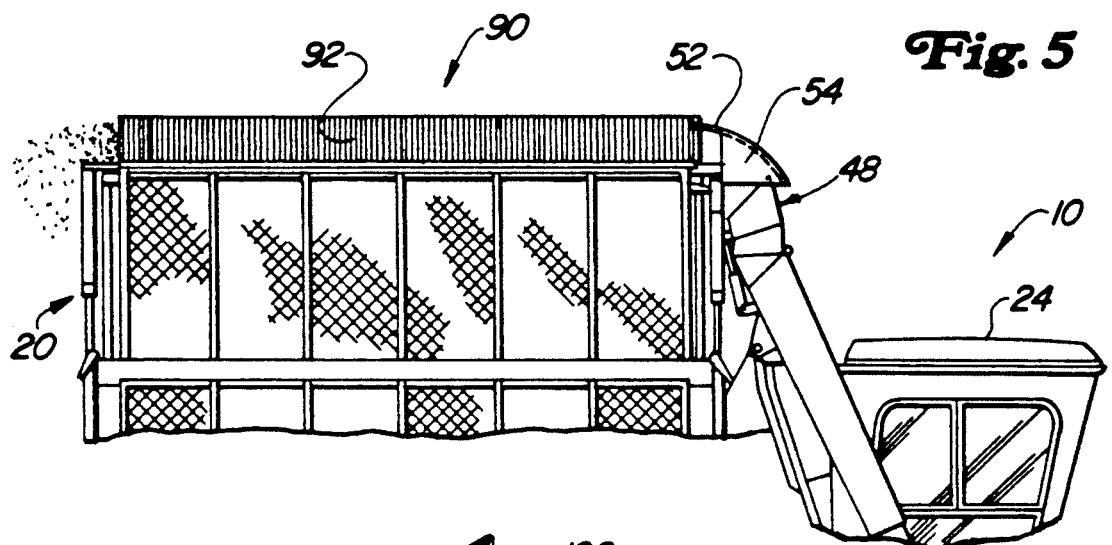
Fig. 5
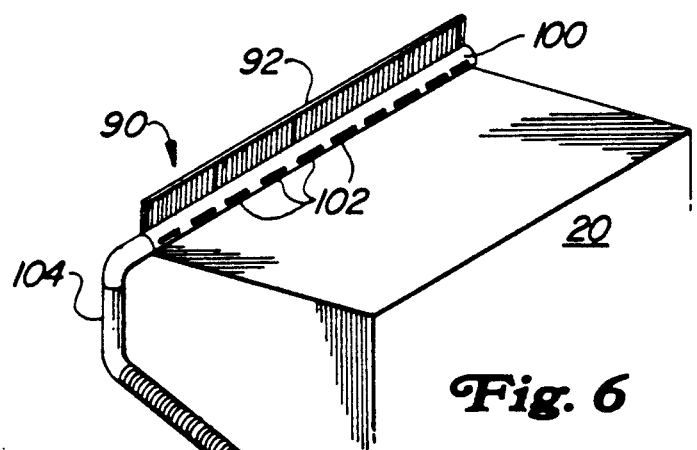
Fig. 6
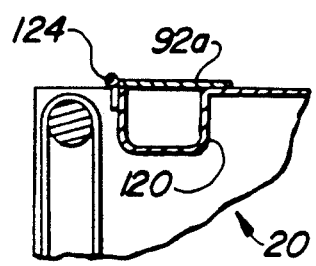
Fig. 7a
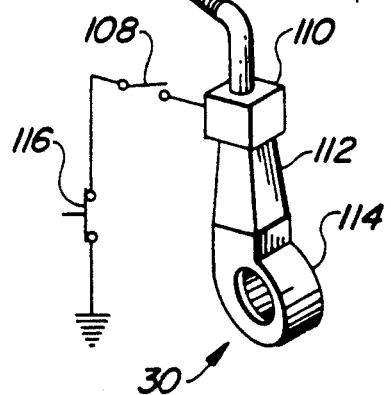
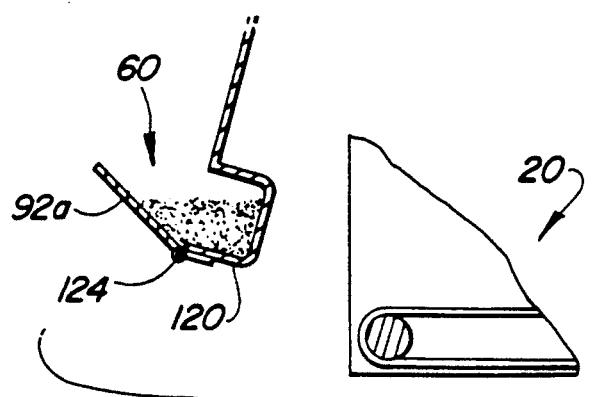
Fig. 7b

BASKET CLEANER FOR A COTTON HARVESTER

BACKGROUND OF THE INVENTION

The present invention relates to cotton harvesters, and more specifically to a cotton harvester basket and structure for cleaning debris from the basket.

A cotton harvester typically includes row harvesting units transversely spaced at the forward end of a frame with cotton conveying ducts extending rearwardly and upwardly from the units to a basket supported on the frame. Air directed into the ducts propels harvested cotton and trash from the units to the basket. Grate structure on top of the basket permits much of the trash to be blown out of the basket while retaining the harvested cotton within the basket. Often a considerable amount of unsightly trash accumulates on the basket top rearwardly of the grate structure. If not removed, the trash can fall into the cotton receiving vehicle or module builder during the dump cycle. The increased trash content can reduce the price that the farmer receives for his cotton. Previously to alleviate the trash build-up problem, the operator had to manually clear the accumulated material from the top. Such a procedure is time-consuming and inconvenient, and often is left undone so that excess trash gets into the cotton.

BRIEF DESCRIPTION OF THE INVENTION

It is therefore an object of the present invention to provide cotton harvester structure which reduces or eliminates the above-mentioned problems.

It is yet another object to provide cotton harvester structure which eliminates the problem of trash on the basket falling into the cotton-receiving receptacle during dumping. It is another object to provide such structure which obviates the need for the operator to manually clean debris from the top of the basket. It is still a further object to provide such a structure which effectively utilizes an existing air source on the harvester to dispel trash from the harvester basket area.

It is yet another object of the invention to provide basket cleaning structure for periodically removing trash from the cotton harvester basket. It is still a further object to provide such a structure which advantageously utilizes the air stream from cotton conveying ducts to blow the trash from the basket surfaces, particularly the top of the basket.

It is yet another object to provide air diverting structure for the cotton conveying ducts of a cotton harvester to direct air from the ducts toward basket surfaces to remove trash from the surfaces.

In accordance with the above objects, duct structure is provided having an upper end selectively positionable between a normal operating position wherein harvested cotton and trash are blown rearwardly and upwardly into the basket, and a basket cleaning position wherein air from the duct is directed rearwardly over the top of the basket. In the operating position, trash is blown through grate structure which retains the cotton within the basket. Periodically, as trash accumulates on the upper surfaces of the basket, air from the duct is directed upwardly against a curved deflector mounted at the upper forward end of the basket which in turn causes the air to blow over the top of the basket and carry the trash rearwardly off the machine. In one embodiment, the upper end of the duct includes a remotely operable portion which, when in the operating position, directs air toward the basket and the grate structure. An actuator moves the duct portion to the cleaning position during periods that cotton is not being conveyed in the duct. Trash accumulations on the basket are blown away without need for the operator to leave the seat of the cab, and problems of excess trash being dumped off of the basket surfaces into the cotton receptacle or module builder are eliminated.

In a second embodiment, a trash barrier is positioned at the dump-side of the basket to catch trash that would otherwise fall into the cotton-receiving receptacle during dumping. Air from a source on the harvester is selectively directed towards the trash to clear the barrier area. One type of barrier is in the form of an elongated brush extending in the fore-and-aft direction parallel to the dump axis of the basket. Air is directed along the brush from a tube leading from the air source on the cotton harvester. Another form of the barrier includes a channel or gutter-like device built in to the dump side of the basket to catch trash including loose dirt. When the basket is rocked to the dump position, a cover on the device pivots open to act as a deflector to direct trash that would otherwise fall off the lid into the device. After the basket is dumped and moved back toward the harvest position, the cover closes over the channel to trap the trash. Air from the cotton conveying duct nearest the device is directed through the channel, which is open at both ends, to clear the trash prior to returning to the field. The confined capture space reduces the amount of air necessary to clear the trash after dumping.

The trash is effectively prevented from being mixed with the harvested cotton during dumping, and periodic manual cleaning of the basket is no longer necessary. The structures which effectively utilize an existing source of air on the harvester are relatively inexpensive to manufacture and increase the productivity of the machine.

These and other objects, features, and advantages of the present invention will become apparent to one skilled in the art upon reading the following detailed description in view of the drawings.

BRIEF DESCRIPTION OF THE DRAWINGS

FIG. 5 is a side view of the harvester of FIG. 4 with the basket in the field-working position.

FIG. 6 is a perspective view of an alternate embodiment of a cleaning arrangement for use with the barrier of FIGS. 4 and 5.

FIG. 7a and 7b show an alternate embodiment of the invention wherein a channel member with a hinged cover that swings out (7b) during dumping to catch trash and closes after dumping (7a) to confine the trash for efficient removal by the air source.

DESCRIPTION OF THE PREFERRED EMBODIMENT

Figure 1:
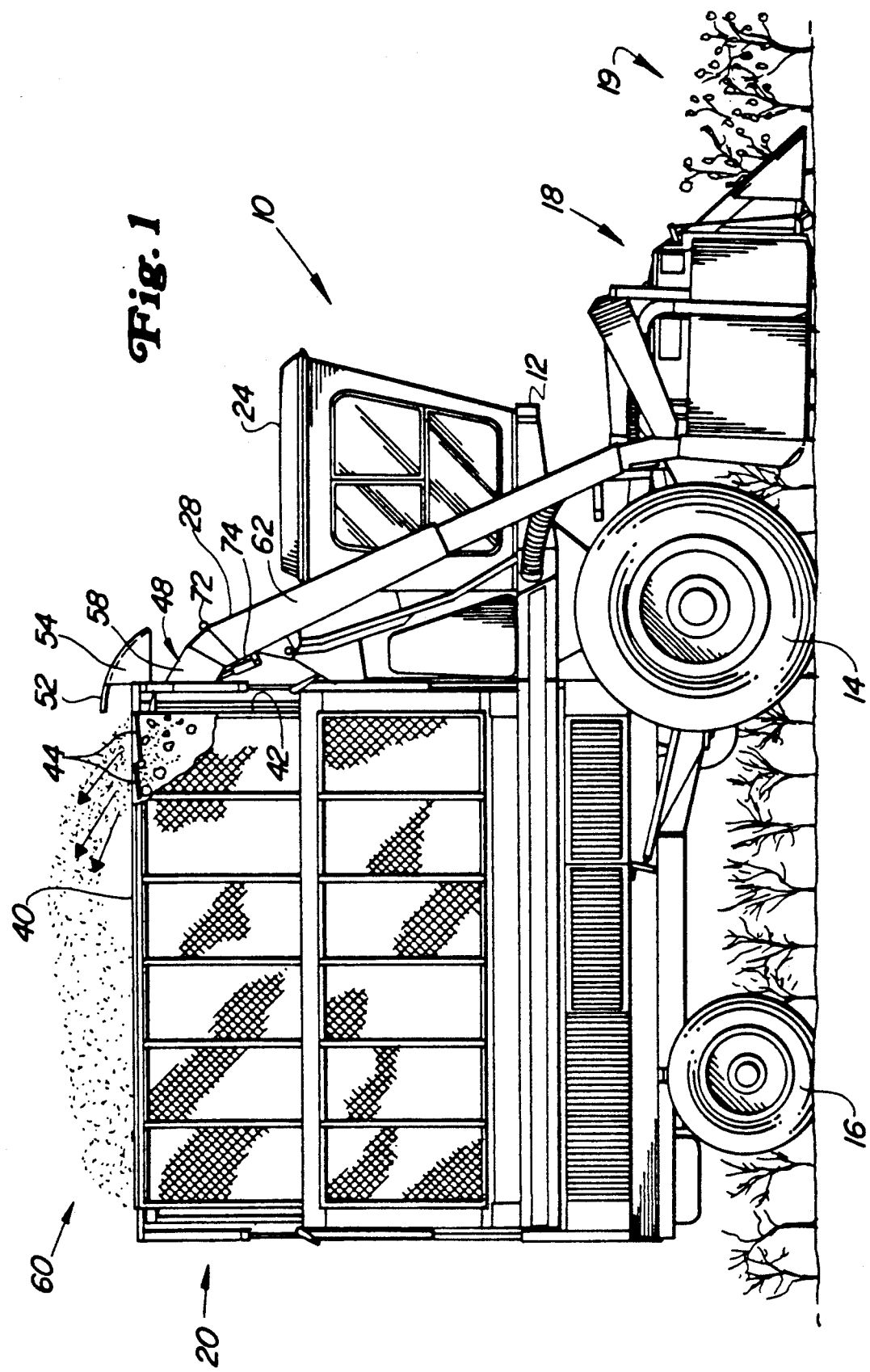
FIG. 1 is a side view of a cotton harvester operating in the field, with the basket cleaning arrangement of the present invention attached thereto.

Referring now to FIG. 1, therein is shown a cotton harvester 10 having a main frame 12 supported for forward movement over the ground by forward ground wheels 14 and rear steerable wheels 16. A plurality of row harvesting units 18 are transversely spaced at the forward end of the frame 12 for removing cotton from rows of cotton plants 19.

A cotton basket 20 is supported from the frame 12 rearwardly of a cab 24 located above the row units 18. Cotton conveying duct structure 28 is connected between the row units 18 and the upper forward portion of the basket 20. Air from a source indicated generally at 30 on the harvester 10 is directed upwardly into the duct structure 28 to move cotton from the row units 18 and propel it upwardly and rearwardly into the basket 20. With the exceptions of areas around the upper portion of the basket 20 and duct structure 28, the cotton harvester 10 is generally of conventional construction and of the type exemplified by the commercially available John Deere model 9960 Cotton Picker.

The basket 20 includes a generally horizontal top or lid 40 extending rearwardly from an upright front wall 42. Grate structure 44 opens from the forward top portion of the lid 40 to permit trash blown upwardly through the duct structure 28 to exit the inside of the basket 20 while retaining the harvested cotton within the basket. The front wall 42 includes an upper opening at location 46 for receiving cotton therethrough from the duct structure 28 while the row units 18 are picking cotton.

Figure 2:
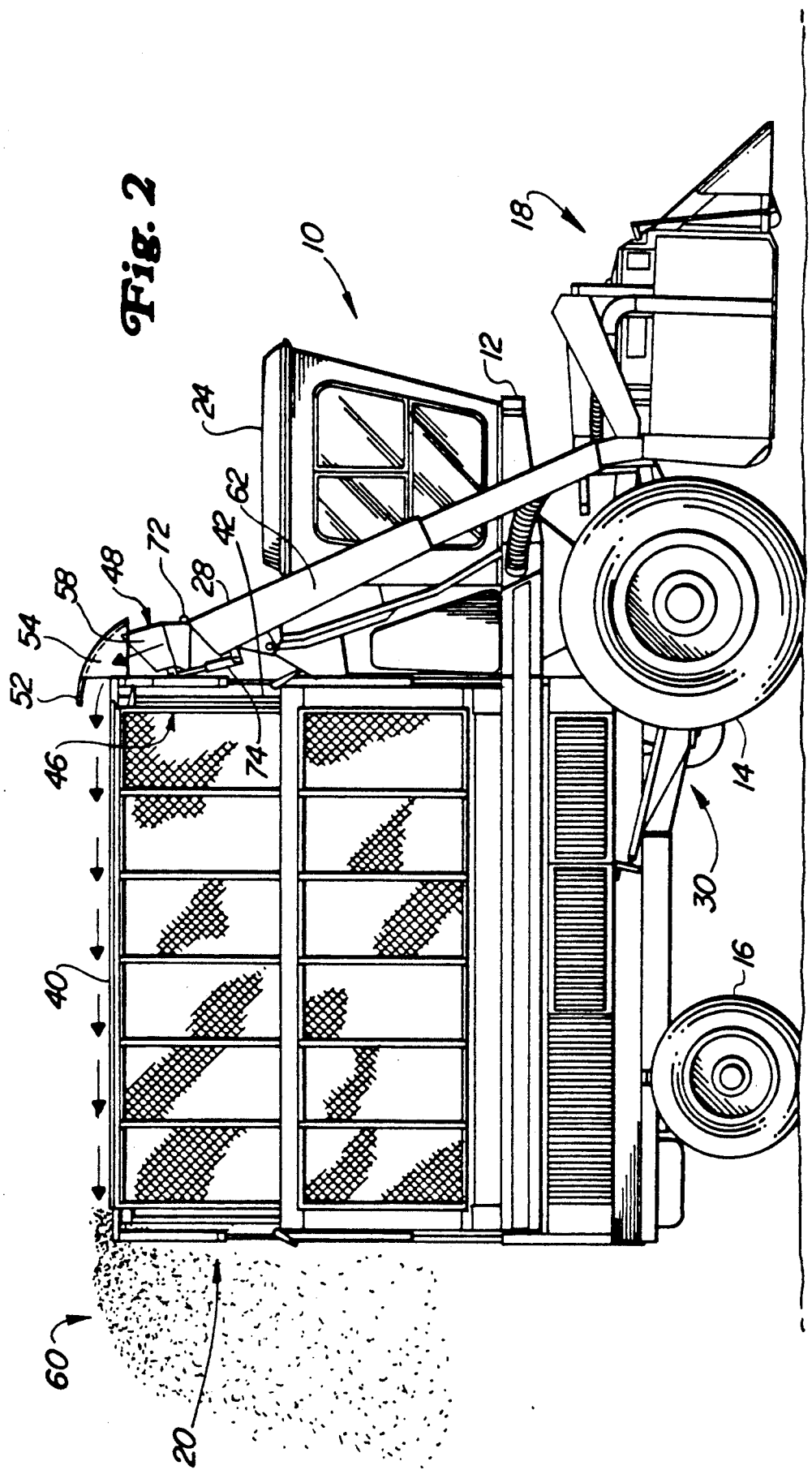
FIG. 2 is a view similar to FIG. 1 but showing the harvested the basket cleaning mode of operation.

The duct structure 28 includes an upper duct portion 48 with structure for selectively directing the stream of air either through the opening 46 towards the grate structure 44 or over the surface of the basket 20 to blow the trash from the surface. As shown in FIGS. 1 and 2, an upwardly and rearwardly curved deflector 52 is supported from the upper forward portion of the basket 20 directly above the duct structure 28 by a bracket 54. The upper duct portion 48 includes a duct 58 rockably connected to the top of an intermediate duct 62 for swinging between a normal operating position (FIG. 1) wherein the outlet of the duct 58 is directed rearwardly and upwardly toward the opening 46 and the grate structure 44, and a bypass or cleaning position (FIG. 2) wherein the outlet opens toward the deflector 52. The deflector 52 is concave towards the front edge of the basket to direct high velocity air from the duct 58 (when in the cleaning position) rearwardly over the top 40 to blow away debris indicated generally at 60.

Figure 3:
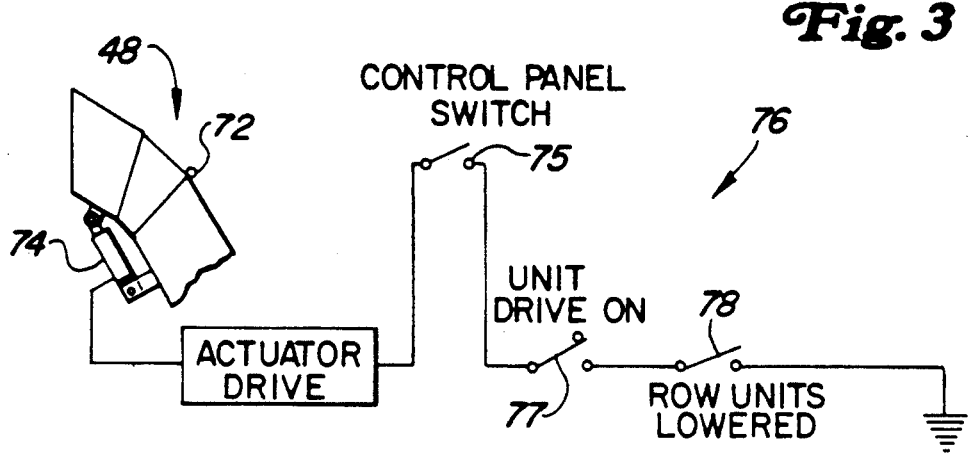
FIG. 3 is a schematic representation showing an actuator circuit for moving an upper cotton-conveying duct portion between the operating position of FIG 1 and the cleaning position of FIG. 2.

As seen in FIGS. 1–3, the duct 58 is connected to the duct 62 for pivoting about a transverse axis by pivots 72. An actuator 74 is connected between the ducts 58 and 62 for pivoting the duct 58 about the axis between the operating and cleaning positions. The actuator 74 is remotely operable from the harvester cab 24. Preferably, the actuator 74 is electrically operated and is controlled from an instrument panel switch 75 (FIG. 3) which is part of an interlock circuit 76 which includes the switch 75 connected in series with a row unit drive switch 77 and a row unit lift switch 78. To assure that no cotton is inadvertently lost while the row units are harvesting cotton, the duct 58 normally remains in the operating position (FIG. 1) and, with the switch 75 closed, moves from the operating position only after the operator lifts the row units to their transport positions and turns the row unit drive off. Once the row units are lowered toward their field-working positions (which opens the switch 78) and/or the row units are turned on (which opens the switch 77), the actuator 74 automatically returns the duct structure 48 to the normal operating position. Alternatively, the actuator 74 may be a hydraulic cylinder connected to a source of hydraulic fluid under pressure on the harvester 10 through a hydraulic or electro-hydraulic circuit (not shown) activated by a control in the cab 24 and responsive to the condition of the row units for preventing movement of the duct structure to the cleaning position when cotton is being harvested.

In operation during picking of cotton, the duct 58 is positioned in the normal operating position shown in FIG. 1. When the operator lifts the row units 18 to their transport position (for example, when turning at the end of the field) and shuts off the row units, the interlock circuitry 76 is enabled. Thereafter, if there is trash accumulation on the basket 20, the operator moves the switch 75 to the on position causing the actuator 74 to pivot the duct 58 to the cleaning position as shown in FIG. 2. A blast of high velocity air is directed rearwardly against the trash 60. After the trash is cleared, the operator moves the switch 75 to the off position to return the duct 58 to the normal operating position. Returning the row units 18 to their field-working positions and/or turning on the row unit drive will also cause the duct to return to the normal operating position regardless of the state of the switch 75.

Figure 4:
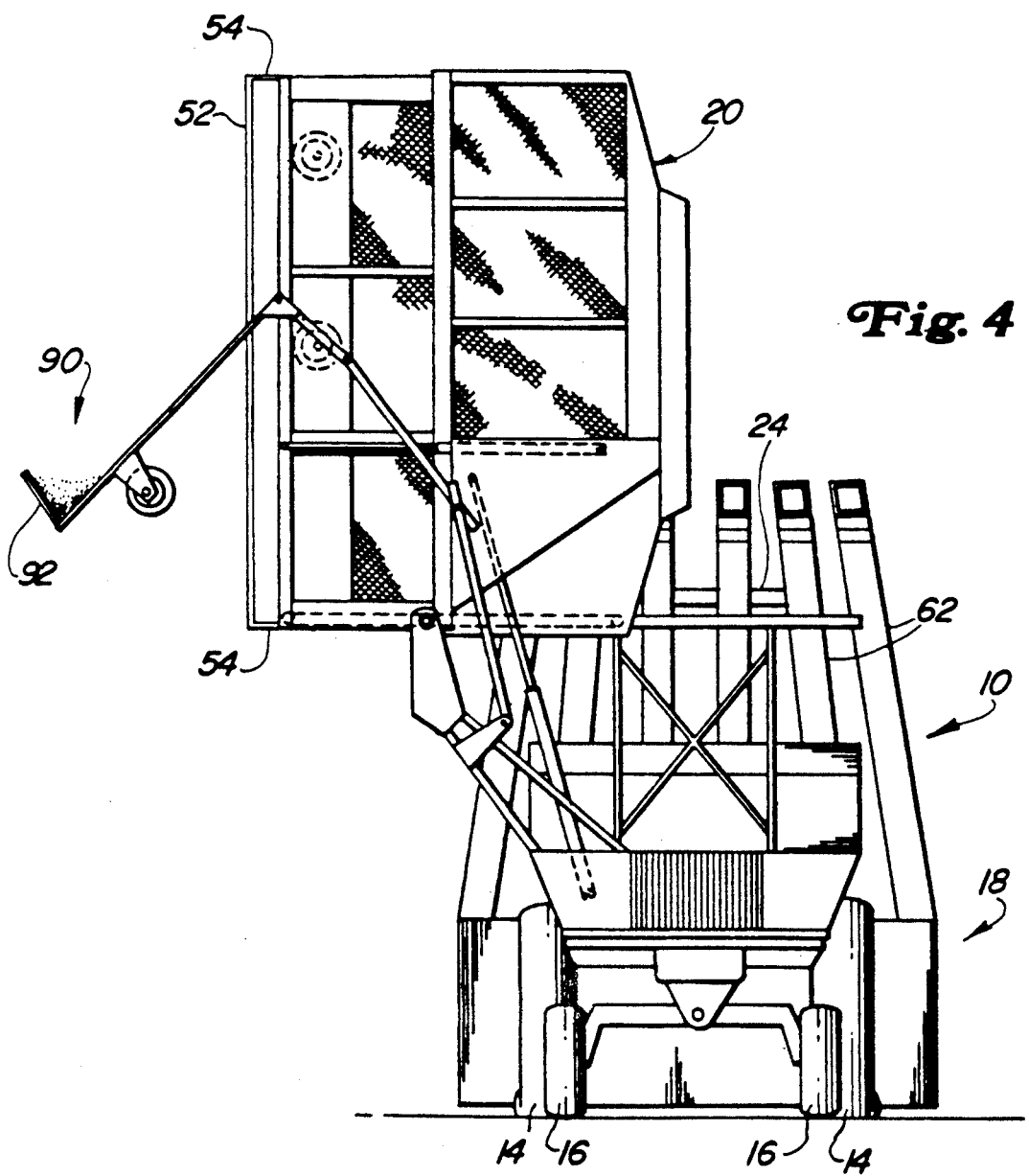
FIG. 4 is a rear view of a harvester with the basket in the dump position and showing a barrier for preventing trash from mixing with the cotton being dumped.

In the embodiment of FIGS. 4 and 5, a fore-and-aft extending barrier or brush structure 90 is secured to the dump side of the basket lid 40. The brush structure 90 includes upstanding bristles 92 which angle slightly toward the opposite side of the basket to act as a barrier to the trash 60 which would otherwise tumble off the basket surfaces and into the cotton mass during dumping of the basket 20. During dumping, the trash will accumulate adjacent on one side of the bristles 92 as shown in FIG. 4.

To dispel the trash after dumping, a source of air under pressure is directed against the accumulated trash. As shown in FIG. 5, the air is directed towards the trash from the duct by a diverter arrangement 52 similar to that described above. In an alternate embodiment (FIG. 6), an air tube 100 having upwardly directed jets or slits 102 is located adjacent the bristles 92 of the brush structure 90. The air tube 100 is aligned with the discharge end an air conduit 104 when the basket is in the field-working position as shown in FIG. 6. The conduit 104 is in communication with the same source of air under pressure on the harvester which propels the cotton through the cotton conveying ducts 28. Preferably, the operator can selectively turn the air supply to the jets 102 on and off from a switch 108 located in the cab. The switch is connected to an electrically operated air valve 110 located between an air manifold 112 on the harvester air supply 114 and the air tube 100. To prevent cotton from being blown from the basket 20 when cotton is being dumped, a dump responsive switch 116 is connected in series with the cab switch 108 and opens when the basket is moved toward the dump position.

In the embodiment shown in FIGS. 7a and 7b, the barrier 92a at the dump side of the basket includes a gutter-like device or channel 120 connected to the dump side edge of the lid 40 and extending substantially from the front to the rear of the basket. The channel 120 projects downwardly into the top side portion of the basket 20 into an area which normally does not completely fill during harvesting so that basket capacity is virtually unaffected. The barrier 92a is in the form of a hinged cover 122 pivotally connected to the outer side of the channel 120 for rocking about an axis 124 parallel to the basket dump axis between a closed field-working position (FIG. 7a) and an open trash-catching position (FIG. 7b). As the basket is moved to the dump position, gravity causes the cover 122 to pivot open and act as a barrier or deflector to direct trash 60 into the channel 120. The trash including fine dirt which has accumulated in the upper areas of the basket is caught in the channel 120.

As the basket 20 is pivoted back to the field-working position (FIG. 7a), the cover 92a rocks back to the closed position to generally enclose the trash in the channel 120. The forward and aft ends of the channel 120 are open and, when the basket is in the field-working position, the open forward end of the channel is in communication with an air nozzle (not shown) supported on the frame which selectively directs a blast of air through the member 120 to clear the trash therefrom prior to the harvester returning to the field so that the channel will be clean and ready for receiving trash on the next dump. An arrangement with an air valve similar to that described above for the air tube 100 is used to selectively direct air from the nozzle 126 through the generally tubular-shaped member defined by the channel 120 and cover 92a. However, since a smaller volume of air is needed, the air preferably is supplied from the cotton conveying duct nearest the channel 120.

Having described the preferred embodiment, it will become apparent that various modifications can be made without departing from the scope of the invention as defined in the accompanying claims.

I claim:

1. In a cotton harvester having a frame supported for forward movement over the ground, a plurality of transversely spaced harvesting units supported on the forward end of the frame, a cotton basket supported on the frame and including surface areas wherein trash accumulates during harvesting, cotton conveying air duct structure for directing harvested cotton and trash rearwardly and upwardly from the harvesting units to the cotton basket, and a source of air connected to the air duct structure, the improvement comprising means for selectively directing air from the source toward the surface areas to blow trash from the basket.

2. The invention as set forth in claim 1 wherein the means for selectively directing air includes an air deflector supported at the forward end of the basket above the air duct.

3. The invention as set forth in claim 2 wherein the means for selectively directing air includes a moveable air duct portion, and means for moving the air duct portion from a normal operating position wherein air is directed rearwardly into the basket, to a basket cleaning position wherein air is directed against the deflector.

4. The invention as set forth in claim 3 wherein the air duct portion comprises the upper end of the air duct structure.

5. In a cotton harvester having a frame supported for forward movement over the ground, a plurality of transversely spaced harvesting units supported on the forward end of the frame for movement between lowered field-operating positions and raised transport positions, a cotton basket supported on the frame, and cotton conveying air duct structure for directing harvested cotton and trash rearwardly and upwardly from the harvesting units to the cotton basket, the basket including a top portion wherein some of the trash accumulates during harvesting, the cotton conveying duct structure including an upper duct portion connected for rocking with respect to the basket from a normal operating position wherein trash and cotton are directed rearwardly toward the basket and a cleaning position wherein air from the duct is directed over the top portion of the basket to blow trash from the top portion, and means for moving the duct portion between the operating and cleaning positions.

6. The invention as set forth in claim 5 wherein the means for moving the actuator comprises remotely operable switch means.

7. The invention as set forth in claim 5 including means for preventing movement of the duct portion to the cleaning position when the row units are in the lowered field-working positions.

8. The invention as set forth in claim 7 including means responsive to the movement of the row units to the field-working positions for disabling the switch means to thereby prevent operation of the duct portion in the cleaning position when the harvester is harvesting cotton.

9. The invention as set forth in claim 5 including upper air grate structure located above the duct portion in the path of the cotton and trash directed rearwardly from the duct portion when the duct portion is in the field-working position, wherein the grate deflects cotton into the basket while permitting the trash to be propelled over the basket so that the trash tends to settle on the basket, and an air deflector located over the duct portion for deflecting air from the duct portion over the grate structure when the duct portion is in the cleaning position.

10. In a cotton harvester having a frame supported for forward movement over the ground, harvesting structure supported on the forward end of the frame, a movable cotton basket supported on the frame and having field-working and dump positions, cotton conveying air duct structure extending rearwardly and upwardly from the harvesting structure to the cotton basket, and a source of air connected to the air duct structure for propelling harvested cotton along with unwanted trash through the duct structure, wherein some of the trash is deposited on an area of the basket, the improvement comprising means for preventing the deposited trash from mingling with the harvested cotton during dumping of the basket including a trash barrier located on the dump side of the area, and means for selectively directing air from the source to blow the trash away from the basket.

11. The invention as set forth in claim 10 wherein the means for directing the air comprises means for directing a blast of air adjacent the barrier.

12. The invention as set forth in claim 10 wherein the the basket includes a lid and is rockable about a fore-and-aft extending axis between a harvesting position wherein the lid is generally horizontal and defines the trash-receiving area and a dump position wherein the lid is inclined downwardly in the direction of the dump side of the basket so that the trash will gravitate toward the dump side, and wherein the barrier comprises an elongated trash-catching member extending in the fore-and-aft direction along the dump side of the lid for preventing the trash from gravitating below the dump side of the lid.

13. The invention as set forth in claim 12 wherein the means for selectively directing air includes means for blowing air along the trash-catching member.

14. The invention as set forth in claim 10 further including a channel connected to the basket for collecting trash during dumping.

15. The invention as set forth in claim 14 wherein the means for directing the air includes means for blowing air through the channel.

16. The invention as set forth in claim 14 wherein the barrier includes a panel, and means pivotally connecting the panel to the basket adjacent the channel for rocking between a dump position wherein the panel directs trash toward the channel for catching the trash during dumping, and a cleaning position wherein removal of the trash from the channel is facilitated.

17. The invention as set forth in claim 16 wherein, when the panel is in the cleaning position, the panel and channel form a generally closed tubular member, and the means for directing air includes a nozzle opening into one end of the defined tubular member for expelling debris from the opposite end of the member.

18. In a cotton harvester having a frame supported for forward movement over the ground, harvesting structure supported on the forward end of the frame, a movable cotton basket supported on the frame and having field-working and dump positions, cotton conveying air duct structure extending rearwardly and upwardly from the harvesting structure to the cotton basket, and a source of air connected to the air duct structure for propelling harvested cotton along with unwanted trash through the duct structure, wherein some of the trash is deposited on an area of the basket, the improvement comprising means for preventing the deposited trash from mingling with the harvested cotton during dumping of the basket including a trash-collecting gutter located on the dump side of the area, and means for selectively directing air through the gutter to blow the trash away from the gutter.

19. The invention as set forth in claim 18 including a cover pivotally connected to the basket for rocking with respect to the gutter between an open position wherein trash is directed into the gutter and a closed position wherein the trash is generally contained within the gutter.

20. The invention as set forth in claim 19 wherein the means for selectively directing air including means for directing air from the source through the gutter when the cover is in the closed position so that the air is substantially contained within the gutter.

* * * * *